US012185073B2

(12) United States Patent
Ichikawa

(10) Patent No.: US 12,185,073 B2

(45) Date of Patent: Dec. 31, 2024

(54) THIN SPEAKER

(71) Applicant: Foster Electric Company, Limited, Tokyo (JP)

(72) Inventor: Kohei Ichikawa, Tokyo (JP)

(73) Assignee: FOSTER ELECTRIC COMPANY, LIMITED, Tokyo (JP)

(*) Notice: Subject to any disclaimer, the term of this patent is extended or adjusted under 35 U.S.C. 154(b) by 196 days.

(21) Appl. No.: 17/769,144

(22) PCT Filed: Oct. 14, 2020

(86) PCT No.: PCT/JP2020/038784

§ 371 (c)(1),
(2) Date: Apr. 14, 2022

(87) PCT Pub. No.: WO2021/075464

PCT Pub. Date: Apr. 22, 2021

(65) Prior Publication Data

US 2023/0127016 A1 Apr. 27, 2023

(30) Foreign Application Priority Data

Oct. 15, 2019 (JP) ................................. 2019-188395

(51) Int. Cl.
*H04R 9/02* (2006.01)
*H04R 7/18* (2006.01)

(52) U.S. Cl.
CPC ............... *H04R 9/025* (2013.01); *H04R 7/18* (2013.01)

(58) Field of Classification Search
CPC ........ H04R 2499/13; H04R 7/18; H04R 9/02; H04R 9/025; H04R 9/043
See application file for complete search history.

(56) References Cited

FOREIGN PATENT DOCUMENTS

| | | | | |
|---|---|---|---|---|
| CN | 206164827 U | 5/2017 | | |
| JP | S63-64199 U | 4/1988 | | |
| JP | H10-155198 | 6/1998 | | |
| JP | 2003-125487 | 4/2003 | | |
| JP | 2011-019147 | 1/2011 | | |
| WO | WO-2011001498 A1 * | 1/2011 | ............. | H04R 9/043 |

OTHER PUBLICATIONS

International Search Report for PCT/JP2020/038784; Japanese Patent Office; Dec. 22, 2020; entire document.
State Intellectual Property Office of the People's Republic of China; Office Action for Application No. 202080062035.1; Nov. 28, 2023; entire document.

* cited by examiner

*Primary Examiner* — Kile O Blair
(74) *Attorney, Agent, or Firm* — ALLEN, DYER ET AL.

(57) ABSTRACT

A damper has an inner circumference including a curve descending in a bow shape. A wave section extends from the outer circumferential end of the curve to the outer circumference of the damper. The inner circumference of the damper is shorter than the wave section.

7 Claims, 14 Drawing Sheets

THIN SPEAKER

CROSS-REFERENCE TO RELATED APPLICATIONS

This application is the § 371 National Stage Entry of International Application No. PCT/JP2020/038784, filed on Oct. 14, 2020, which claims the benefit of Japanese Patent Application No. 2019-188395, filed on Oct. 15, 2019, the contents of which applications are herein incorporated by reference in their entirety.

FIELD OF THE INVENTION

The present disclosure relates to a thin speaker, and more particularly to a thin speaker suitable for use as a notification speaker in a next-generation automatic collision notification (ACN) system.

BACKGROUND OF THE INVENTION

Automobiles bring us even to places inaccessible by public transportations such as trains or buses and art thus highly convenient as a transportation means. Automobiles are also used for leisure which enriches our lives. In addition, automobiles transport materials and contribute to industrial aspects.

For these reasons, automobiles are widely spread worldwide and their market is expanding.

However, with the spread, and increasing number of various automobile accidents occur, which requires security measures.

In recent years, with the worldwide development of the information technology (IT) and with the employment of the Internet of things (IoT), the construction of a safety system for connecting automobiles and the Internet has been accelerated.

As a typical safety system employing the IoT, there is an automatic vehicle emergency notification system which is automatically or freely connected to an emergency notification center to check the safety of a driver or a passenger at the occurrence of an automobile accident.

FIG. 15 is a conceptual diagram of such an automatic vehicle emergency notification system.

Reference character 100 denotes a communication satellite for constantly obtaining the position information on an automobile, for example, 101 denotes an emergency notification center, 102 denotes an automobile, 103 denotes an emergency center, and 104 denotes an emergency vehicle.

This system is configured as follows. Assume that the automobile 102 is involved in an accident while traveling, for example. An airbag system is activated or the driver or a passenger operates a call button of an emergency call device mounted on the automobile. Then, as indicated by the arrow H, the emergency notification is made to the emergency notification center 101 which then transfers the report to the emergency center 103 as indicated by the arrow R. The contents of the information to be transmitted include voice, sound, and the vehicle information (e.g., the position, orientation, registration number, type, and other characteristics of the vehicle). Such information is transmitted via the networks H and R to the emergency notification center 101 and the emergency center 103 to dispatch the emergency vehicle 104 closest to the accident site and increase the life saving rate.

Such a system is called "eCall system", developed, and provided in the European Union (EU).

The "eCall system" is a name of a next-generation automatic collision notification (ACN) system developed by the EU. The eCall system includes an eCall terminal function, public safety answering points (PSAPs), the EU emergency phone number 112, and a mobile telephone line.

In Russia, such a system called "ERA-GLONASS" has been developed.

ERA-GLONASS is a service in Russia that aims to reduce the response time at the occurrence of an accident or other emergency situations on a road.

This ERA-GLONASS employs almost the same specification as the European eCall system. That is, the same principles and protocol are used. On the other hand, the ERA-GLONASS provides a redundant transfer channel under the minimum set of data (MSD) protocol such as the short message service (SMS). For example, the designs have been made for managing vehicles and providing service such as a toll road system and digital tachographs (using automatic digital tachometers).

As a feature, there is provided a function that is configured to, in case of a connection failure between an audio circuit and the center, transmit the information on an in-vehicle system (IVS) and the vehicle position to the emergency notification center through the SMS. The current European eCall lacks such a function.

Such a system is called "ONSTAR (registered trademark)" in the United States and "HELPNET (registered trademark)" in Japan and developed.

In addition to miniaturization and a high sound pressure that are required to typical industrial devices, these systems need to allow clear communications and thus have flat frequency characteristics in a voice range.

As an application example, as shown in FIG. 16, mounted on a ceiling of a vehicle is an overhead console 200 which includes an SOS switch 201 for an emergency call, and a speaker 202 for emergency notification, for example. A vehicle emergency notification system is usually operated automatically by the activation of an airbag system, but includes the SOS switch 201 and the speaker 202 for emergency notification so as to be manually activated. Reference character 203 denotes a finger for operating the SOS switch 201, and reference character 204 denotes a switch for opening and closing the sunroof of the vehicle.

In this case, in order to increase the space inside the vehicle, the overhead console 200 needs to be thin.

Accordingly, the speaker 202 for emergency notification needs to have a smaller thickness in addition to a smaller size, which limits sizes, performance, and other characteristics.

Specifically, the required specifications are as follows, for example.

Total height: 10 mm

Aperture: 40 mm fo: 400 Hz

Various small sized speakers are available.

CITATION LIST

Patent Document

Patent Document 1: Japanese Unexamined Utility Model Publication No. S63-64199

Patent Document 2: Japanese Unexamined Patent Publication No. H10-155198

Patent Document 1 relates to a structure of a damper for a thin speaker that supports a vibration system. This damper is corrugated over its entire surface. This corrugated damper has two types of corrugations. While first corrugations are located above substantially at the center, second corrugations are located below on the outer circumference of the first corrugations with a step interposed between.

In this Patent Document 1, the damper is corrugated over its entire surface to increase allowable inputs. However, the structure only with the corrugations has an insufficient rigidity and poor distortion characteristics.

In addition, there is a problem in that a higher input resistance causes a poor compliance of the support system and thus increase the lowest frequency fo.

Patent Document 2 discloses a damper in a bow shape over its entire surface from the inner to the outer circumference. Such a damper shape in a bow as a whole hinders the miniaturization. A damper in a bow shape as a whole with a larger number of corrugations to soften the damper has difficulty in limiting the amplitude at a vibration of the damper. When the damper moves downward, a voice coil bobbin comes into contact with a yoke to cause an abnormal sound.

SUMMARY OF THE INVENTION

The present disclosure was made in view of the foregoing. It is an objective of the present disclosure to provide a thin speaker having a small aperture, applicable to a next-generation ACN system, including a diaphragm with a highly symmetric amplitude and excellent distortion characteristics, and reducing an increase in the lowest resonance frequency fo.

A thin speaker according to an embodiment of the present invention includes: a voice coil bobbin including a voice coil and having an upper end to which a back surface of a diaphragm body is attached; the diaphragm body having an outer circumference attached to a thin frame with an edge interposed therebetween; the thin frame having a bottom including a magnetic circuit having a magnetic gap; the magnetic gap including the voice coil, the voice coil bobbin to which an inner circumference of a damper is attached, and the damper having an outer circumference attached to a mount for the outer circumference of the damper in the thin frame; and the inner circumference of the damper including a curve descending in a bow shape, a wave section extending from an outer circumferential end of the curve to the outer circumference of the damper, the inner circumference of the damper being shorter than the wave section.

According to an aspect of the present invention, the inner circumference of the damper includes a bend protruding upward and having a flat upper surface in contact with and attached to the back surface of the diaphragm body.

According to another aspect of the present, the wave section includes at least two or more waves each having a vertex at a height equal to or lower than an outer circumferential end of the outer circumference of the damper.

According to a further aspect of the present invention, the curve includes a fold that orients the curve downward and increases rigidity.

According to an additional aspect of the present invention, an outer circumferential end of the outer circumference of the damper is located lower than the bend.

According to another aspect of the present invention, the damper is shaped to pass through a point lower than an outer circumferential end of the damper between the bend and the outer circumferential end.

According to a further aspect of the present invention, the outer circumferential end of the curve is located lower than an upper end of a yoke of the magnetic circuit.

According to an additional aspect of the present invention, two or more waves include at least a first inner wave on an inner circumference and a second outer wave on an outer circumference, and the vertex of the first inner wave is located lower than the vertex of the second outer wave.

Advantageously, the inner circumference of the damper includes the curve extending to the outer circumference and descending in a bow shape toward the yoke located below, thereby increasing the rigidity. This configuration reduces deformations of the damper toward the yoke, and the abutting of the lower end of the voice coil bobbin onto the yoke of the magnetic circuit when the diaphragm moves downward.

The wave section is longer than the inner circumference of the damper. Accordingly, the outer circumference of the damper has a sufficient softness at the usually reproduced acoustic level, which reduces an increase in the lowest resonance frequency fo.

The non-linearities of the edge and of the damper cancel each other, which causes a symmetric amplitude of the diaphragm, eliminates a distortion, and improves the acoustic characteristics.

The bend allows reliable adhesion of the damper to the diaphragm body. In addition, a space is secured between the damper and the yoke, which reduces the abutting of the damper onto the yoke when the vibration system moves downward.

The space is secured between the lead wire out of the voice coil and the wave section of the damper, which reduces the abutting of the lead wire out of the voice coil onto the vertexes of the waves of the damper when the diaphragm moves downward. In addition, there are two or more waves. That is, the wave for adjusting the distance between the lead wire out of the voice coil and the damper can be separated from the wave for adjusting the non-linearity of the damper. This allows the adjustment of the non-linearity of the damper in addition to securing the space between the lead wire and the damper, and improves the acoustic characteristics.

The fold orients the curve toward the yoke and improves the rigidity. This shape increases the hardness, reduces the downward movement, and thus further reduces the abutting of the damper onto the yoke when the vibration system moves downward.

The outer circumferential end of the damper is located lower than the bend. This secures a sufficient space between the diaphragm and the damper to easily arrange the lead wire, and thus reduces the contact between the lead wire and the damper when the vibration system moves downward. This also secures a sufficient distance between the lead wire and the wave section, that is, a sufficient space for placing the wave section, which increases the flexibility in designing the damper. This configuration further reduces the thickness of the speaker.

The damper is shaped to pass through a point lower than the outer circumferential end between the bend and the outer circumferential end. With this configuration, the damper has a greater radial length even in a tiny space between the thin frame and the lead wire or the diaphragm than in a linear connection between the bend and the outer circumferential end of the damper. This allows efficient arrangement of the curve and the wave section, improves the flexibility in designing the damper, and reduces the thickness of the speaker.

The outer circumferential end of the curve is located lower than the upper end of the yoke. This allows efficient arrangement of the curve and the wave section and further reduces the thickness of the speaker.

The first wave has a lower vertex than the second wave. The damper is more easily stretched and less likely to move under the voice coil than in the case where the vertexes of the first and second wave are at the same height. This configuration reliably reduces the abutting of the voice coil onto the bottom when the vibration system moves downward.

DETAILED DESCRIPTION OF PREFERRED EMBODIMENT

Figure 11:
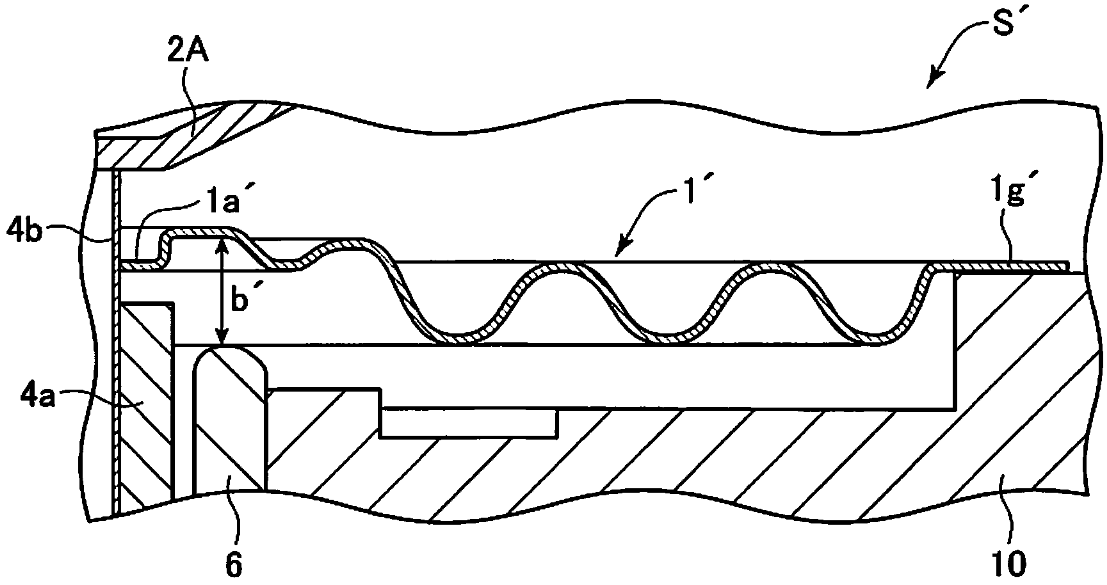
FIG. 11 shows a schematic half-sectional view of a prototype prepared prior to the present disclosure.

In order to develop a speaker for a vehicle emergency notification system satisfying the specifications described above, the present inventor prepared a prototype of a thin speaker as shown in FIG. 11.

In FIG. 11, reference character 1' denotes a damper that vibratably supports a voice coil bobbin 4*b*. This damper 1' has an inner circumferential end 1*a*' attached to the outer circumferential surface of the voice coil bobbin 4*b* by an adhesive. The damper 1' has an outer circumferential end 1g' whose lower surface is attached to the upper surface of a thin frame 10 on the right in the figure.

The thin frame 10 of this prototype has an aperture of, for example, 40 mm that matches an emergency notification system of an eCall system. The thin speaker S' has an overall height of 10 mm. In an operation, upon receipt of an audio current, a voice coil 4*a* in a magnetic field vibrates so that a diaphragm 2A coupled to the voice coil bobbin 4*b* including the voice coil 4*a* moves back and forth (or up and down).

The damper 1' of this thin speaker S' has corrugations extending substantially linearly from its inner to outer circumference. The inner circumferential end 1*a*' of the damper is attached to the voice coil bobbin 4*b* at substantially the same height as the outer circumferential end 1g' of the damper attached to the mount for the outer circumference of the damper.

Figure 12:
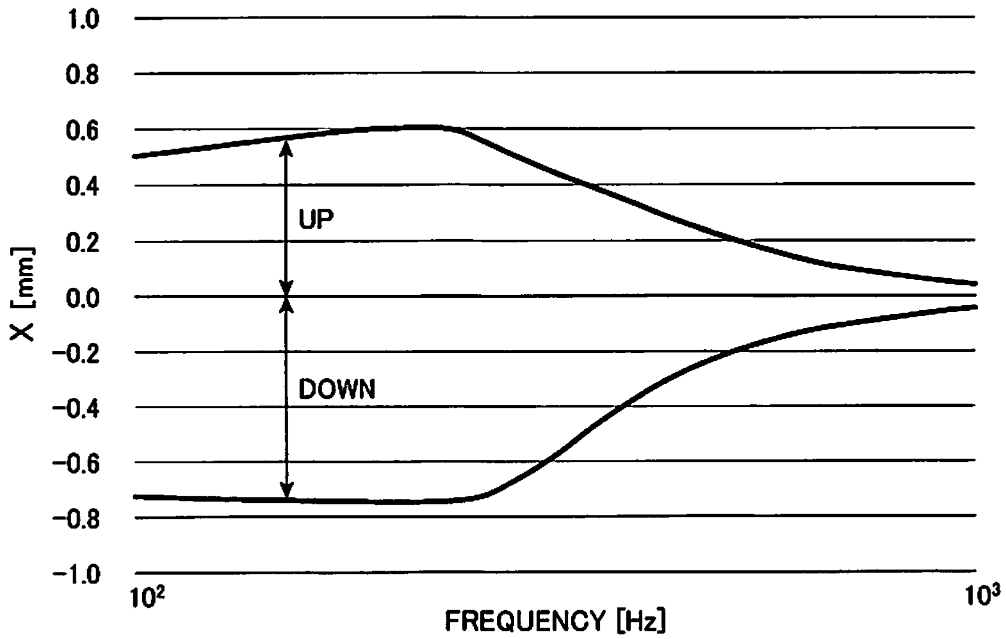
FIG. 12 shows a result of measuring the amplitude of a damper of the prototype.

FIG. 12 shows the amplitude characteristics of the prototype. The amplitude is asymmetric between the forward movement ("UP") and the backward movement ("DOWN") opposite to the forward movement, and greater in the backward movement. The vibration system tends to move downward, which affects the distortion. This is because the damper 1' is corrugated uniformly over its entire surface and has a lower rigidity.

Figure 13:
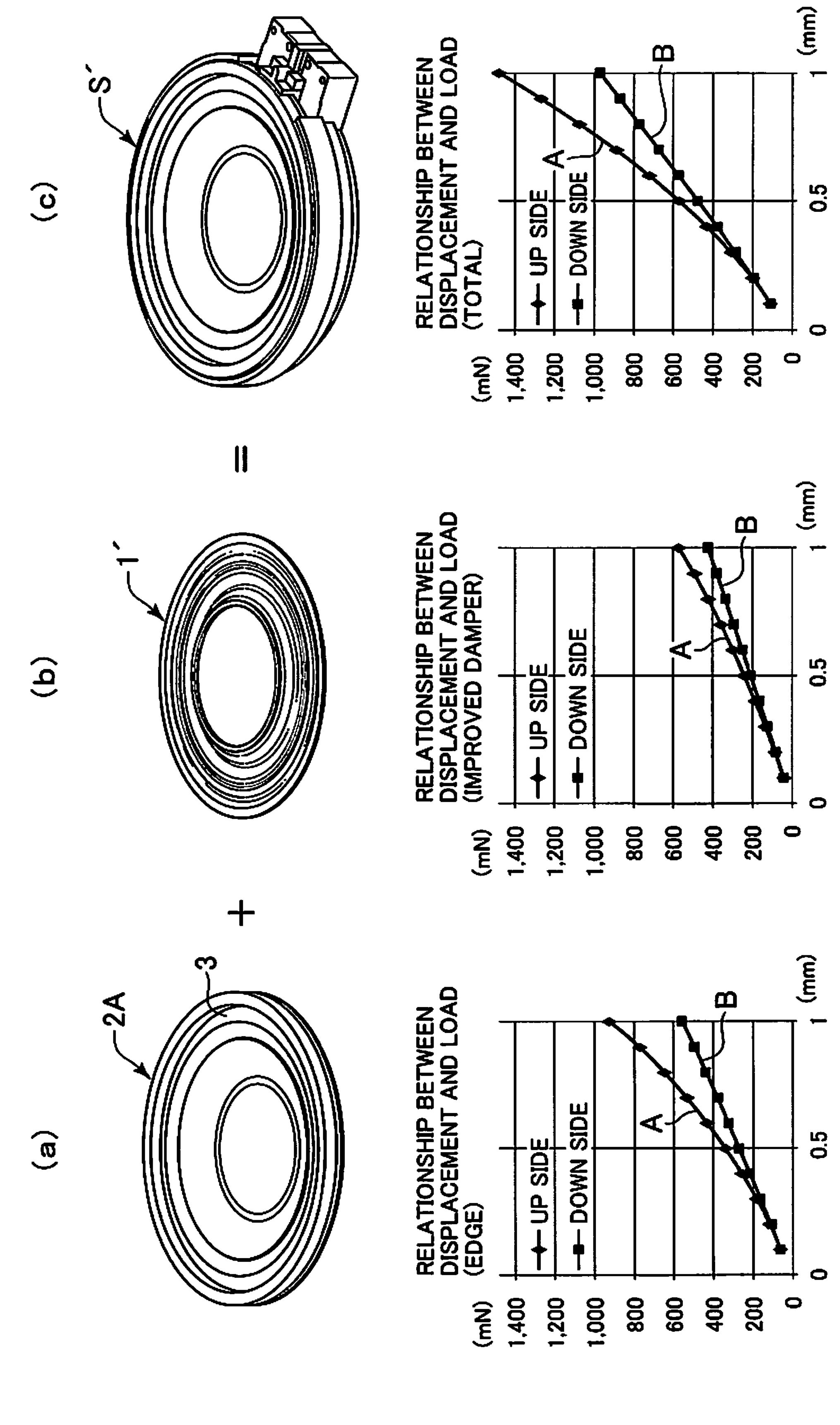
FIG. 13 illustrates a simulation result in a vibration system of the prototype.

FIG. 13 shows simulation results in the vibration system (i.e., the diaphragm 2A and damper 1') described above.

In each lower graph in FIG. 13, the vertical axis represents a load and the horizontal axis represents a displacement.

The curve A shows a forward "UP-SIDE" movement, and the curve B shows a backward "DOWN-SIDE" movement.

FIG. 13 includes the illustrations (a) to (c) respectively showing relationships between a load and a displacement of an edge 3 on the outer circumference of the diaphragm 2A, the damper 1', and (the total displacement of) the vibration system of the thin speaker S' as the integration thereof.

It is found from the simulation results that the "DOWN-SIDE" requires a lower load than the "UP-SIDE" to cause the same displacement, and both the edge 3 of the diaphragm 2A and the damper 1' tend to move downward.

Accordingly, when the vibration system moves downward, the voice coil abuts onto the bottom.

Figure 14:
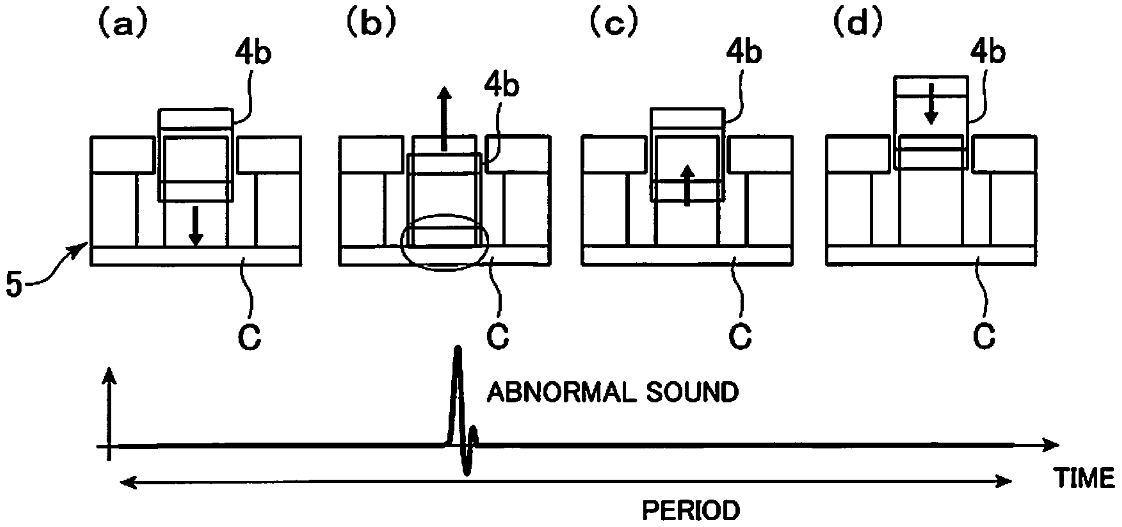
FIG. 14 illustrates a movement of a voice coil with respect to a magnetic circuit in the prototype in one period.
Figure 15:
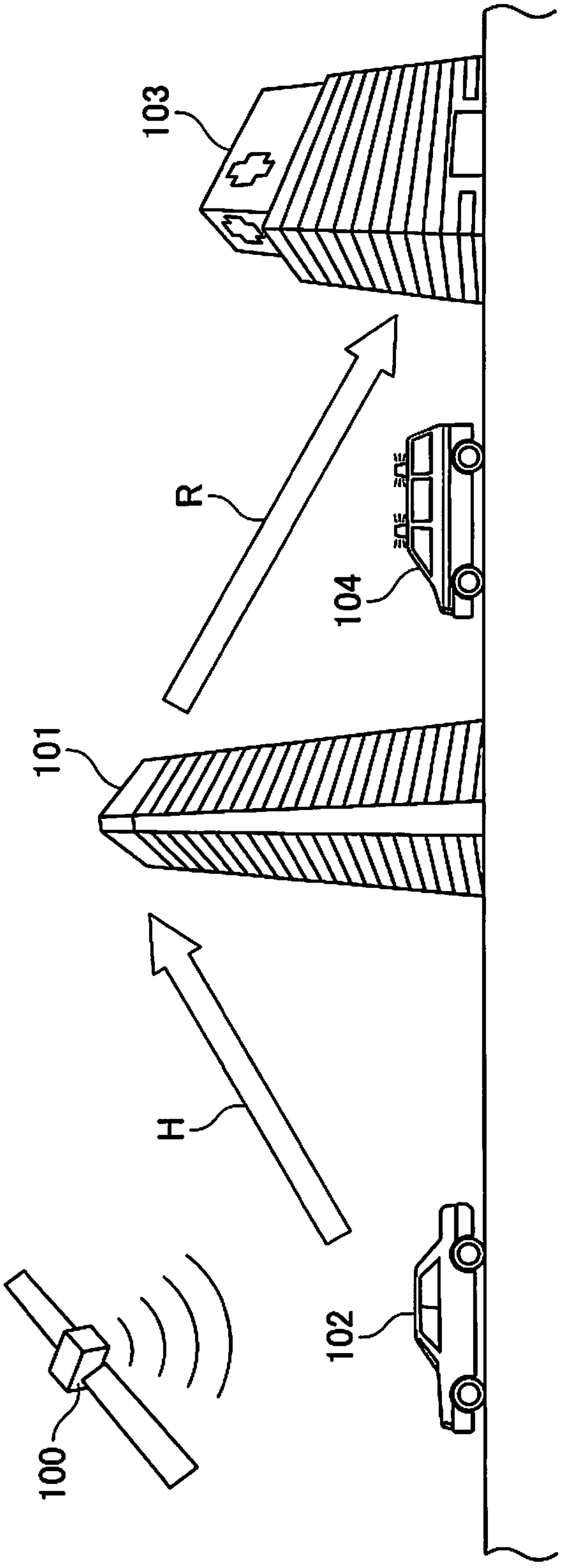
FIG. 15 is a conceptual diagram of a vehicle emergency notification system.
Figure 16:
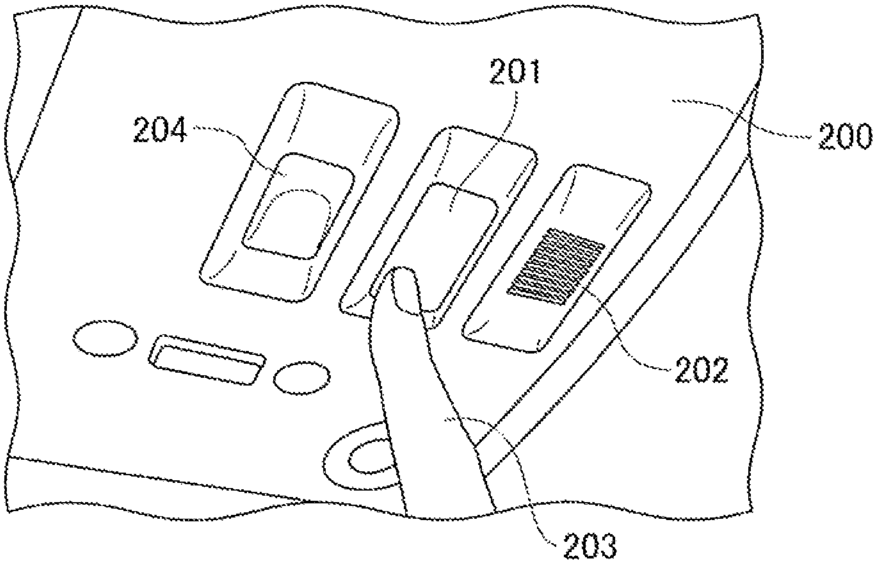
FIG. 16 illustrates an overhead console on the ceiling of a vehicle.

In FIG. 14, the illustrations (a) to (d) show a movement of the voice coil bobbin 4*b* in one period of the forward and backward movement of the diaphragm 2A. In FIG. 14, reference character C denotes the bottom of a magnetic circuit 5, and 4*b* denotes the voice coil bobbin.

In this one period, at a downward movement, the voice coil bobbin 4*b* abuts on the bottom C of the magnetic circuit 5 as surrounded by a circle in (b) to cause an abnormal sound. In FIG. 14, the lower graph illustrates the occurrence of the abnormal sound.

In the prototype, as shown in FIG. 11, the space b between the back surface of the inner circumferential end 1*a*' of the damper and the front end of a yoke 6 is narrow. The inner circumferential end 1*a*' of the damper may abut on the upper end of the yoke 6.

In such the thinned prototype, the voice coil bobbin 4*b* abuts onto the bottom at a high input level. That is, the prototype cannot withstand a high input level. To address the problem, there is a need to reduce the abutting of the voice coil bobbin 4*b* onto the bottom and the abutting of the damper onto the yoke even at a high input level.

The prototype has the asymmetric amplitude between the forward and backward movement. There is also a need to improve the amplitude symmetricity of the diaphragm.

The present disclosure was made in view of the foregoing. It is an objective of the present disclosure to provide a thin speaker meeting the specifications of an ACN system having a highly symmetric amplitude, reducing the abutting of the voice coil onto the bottom, and reducing an increase in the lowest resonance frequency fo.

EXAMPLE

Figure 1:
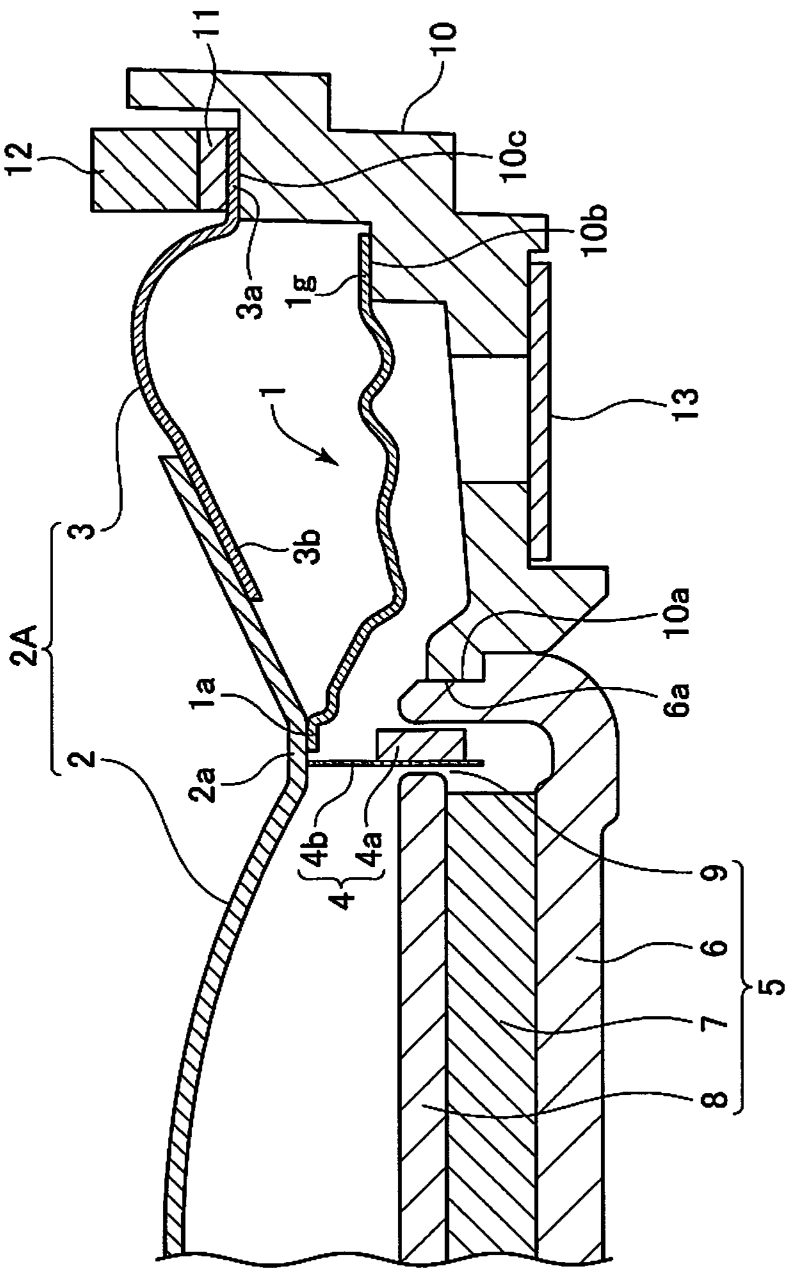
FIG. 1 is a half-sectional side view of a thin speaker according to an embodiment of the present disclosure.
Figure 2:
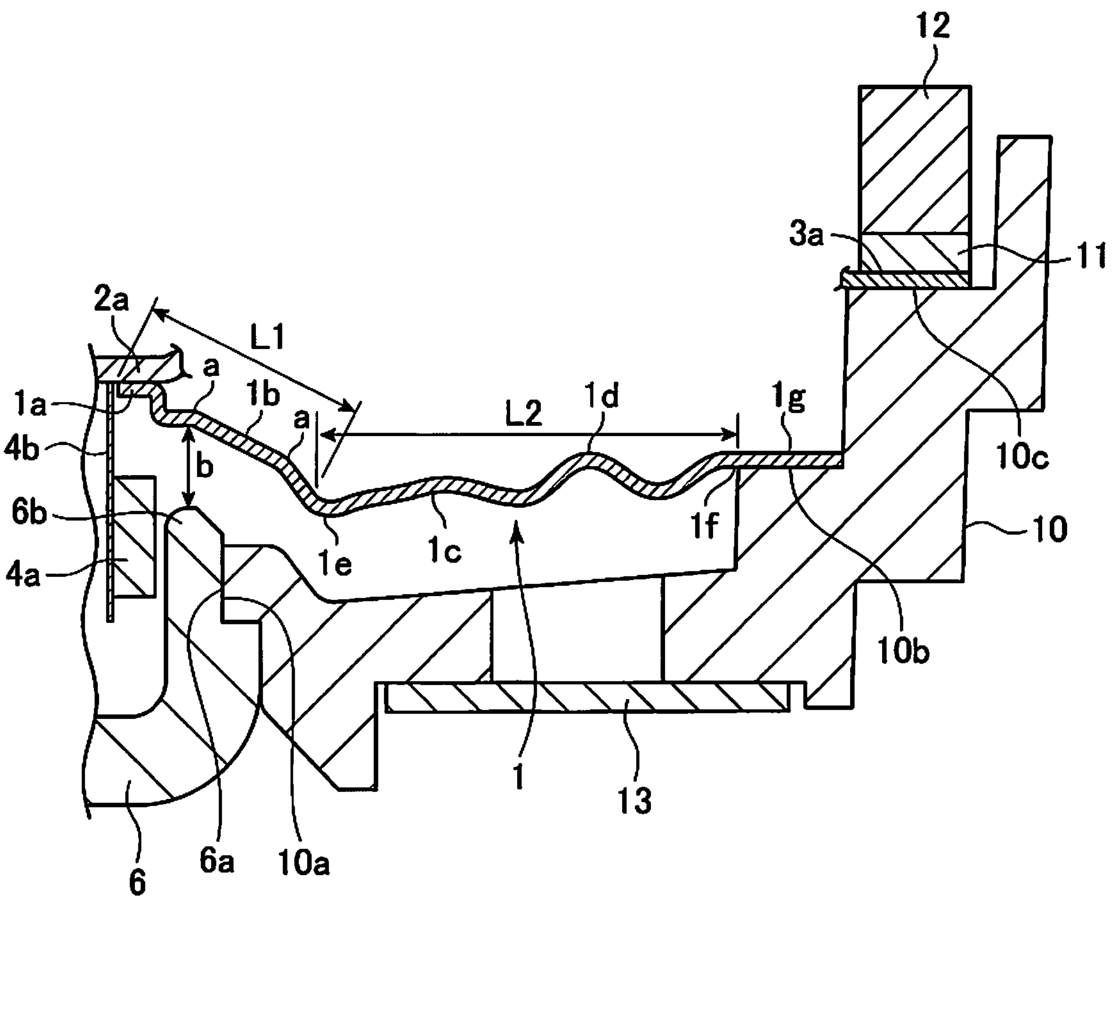
FIG. 2 is an enlarged illustration of a main part of the thin speaker.

FIG. 1 is a half-sectional side view of a thin speaker according to an embodiment of the present disclosure. FIG. 2 illustrates the main part of the above thin speaker.

The present disclosure has a main feature in the cross-sectional shape of a damper 1 that supports a vibration system.

The vibration system includes, for example, a diaphragm 2A, a voice coil 4, and the damper 1. The diaphragm 2A includes a cone-shaped diaphragm body 2, and a ring-shaped edge 3 on the outer circumference of the diaphragm body 2. The voice coil 4 is located at the center of the back surface of the diaphragm 2A to vibrate the diaphragm 2A. This voice coil 4 with a voice coil 4*a* wound around the outer circumference of a cylindrical voice coil bobbin 4*b* may be simply referred to as a "voice coil 4" in the speaker industry. With the inner circumferential end (i.e., a bend 1*a*) of the inner circumference L1 of the damper attached to the voice coil bobbin 4*b*, the voice coil 4 is located in a magnetic gap.

In FIG. 1, reference character 5 denotes a magnetic circuit. This magnetic circuit 5 includes a yoke 6, a magnet 7, and a plate 8. The yoke 6 has a bottomed cylindrical shape. The magnet 7 is located on the bottom of the yoke 6 and has a cylindrical shape. The plate 8 is located on the upper surface of the magnet 7 and has a circular shape in a plan view. Interposed between the outer circumferential surface of the plate 8 and the corresponding inner circumferential surface of the yoke 6 is a magnetic gap 9. The magnetic circuit 5 is located on the bottom of the thin frame 10. The magnetic circuit 5 is of an inner magnetic type, but may be of an outer magnetic type.

Reference character 10 denotes the thin frame with a small aperture of 40 mm or smaller, which is prepared in a size according to a specification required for an automatic vehicle notification system. The thin frame 10 has, at its inner circumferential end, a step-shaped frame mount 10*a* corresponding to the outer circumferential end 6*a* of the yoke 6 to integrate the thin frame 10 and the yoke 6.

The thin frame 10 has, on the outer circumference of its inner surface, a step-like mount 10*b* for the outer circumference of the damper and a step-like mount 10*c* for the outer circumference of an edge. The mount 10*c* is located above and outside the mount 10*b*.

The mount 10*b* is located slightly higher than the upper end 6*b* (see FIG. 2) of the yoke 6, as can be seen from the state shown in the figure. The mount 10*c* is located higher than the mount 10*b*. The thin frame 10 has a dust-proof fabric 13 on its back surface.

The lower surface of the outer circumference 3*a* of the edge is attached to the mount 10*c* of the thin frame 10 by an adhesive. The outer circumference 3*a* of the edge includes a ring 11 and a gasket 12 on its upper surface. The length (or an overall height Ht) between the upper surface of the gasket 12 and the back surface of the yoke 6 is set to 10 mm or lower (but not 0 mm) so that the frame 10 has a smaller thickness.

The inner circumference 3*b* of the edge is bonded to the outer circumference of the diaphragm body 2 by an adhesive. Accordingly, the outer circumference of the diaphragm body 2 is attached via the edge 3 to the thin frame 10.

An upper end of the voice coil bobbin 4*b* including the voice coil 4*a* is bonded to the back surface of a voice coil mount 2*a* of the diaphragm body 2 by an adhesive.

The damper 1 has, on the inner end of its inner circumference (i.e., the inner circumference L1 of the damper), the bend 1*a* protruding upward and having a flat upper surface which is in contact with and attached to the back surface of the voice coil mount 2*a* of the diaphragm body 2 by an adhesive. The outer circumferential end 1*g*, which is the outer end of the outer circumference of the damper, is attached to the mount 10*b* of the thin frame 10 by an adhesive.

As shown in detail in FIG. 2, the outer circumference of the bend 1*a* of the damper 1 has a curve 1*b* descending in a bow shape toward the back surface of the speaker. This configuration increases the rigidity of the inner circumference of the damper 1, reduces deformations and downward movements of the damper, and reduces the abutting of the voice coil bobbin 4*b* onto the bottom.

In the shown example, this curve 1*b* has two folds. These serve to orient the inner circumference L1 of the damper downward and to increase the rigidity. Note that the curve 1*b* may have only one fold a. Alternatively, the curve 1*b* may have no fold a.

The inner end of the bend 1*a* on the inner circumference L1 of the damper is attached to the upper end of the voice coil bobbin 4*b*. The curve 1*b* secures a space b between the back surface of the inner circumference L1 of the damper and the upper end 6*b* of the yoke 6 to reduce the abutting of the voice coil 4 onto the bottom when the damper 1 moves downward in accordance with a downward movement of the diaphragm 2A and to reduce the abutting of the damper 1 onto the upper end 6*b* of the yoke 6.

In this manner, the curve 1*b* serves to increase the shape rigidity while securing the space b with the yoke 6.

The damper 1 has the inner circumference L1 in the area including the bend 1*a* and the curve 1*b*, and a wave section L2 on its outer circumference. L2 is longer than L1, that is, L1<L2. This configuration reliably provides the softness of the damper 1 at a usually reproduced acoustic level to reduce an increase in the lowest resonance frequency fo.

The damper is rigid on its inner circumference L1 due to its bow-shaped curve 1*b*, and soft in the wave section L2.

Specifically, the area from the outer circumferential end 1*e* of the bow-shaped curve 1*b*, which is the outer circumference of the inner circumference L1 of the damper, to the outer circumferential end 1*f* of the wave section L2 is soft to reduce an increase in the lowest resonance frequency fo, operate at a required lowest resonance frequency fo, and provide desired frequency characteristics.

The mount 10*b* for the outer circumference of the damper is located lower than the inner circumferential end of the bend 1*a* which is the mount for the inner circumference of the damper 1. The wave section L2 is located lower, that is, closer to the back surface of the thin frame 10 with a space interposed between. This secures a sufficient space between the diaphragm 2A and the damper to easily arrange a lead wire and thus reduces the contact between the lead wire and the damper when the vibration system moves downward. This also secures a sufficient distance between the lead wire and the wave section L2, that is, a sufficient space for placing the wave section L2, which increases the flexibility in designing the damper. This configuration further reduces the thickness of the speaker.

The wave section L2 may have at least two or more waves, for example, a first wave 1*c* on the inner circumference and a second wave 1*d* on the outer circumference of the first wave 1*c*.

The first wave 1*c* is gently inclined forward from the outer circumferential end 1*e* of the curve 1*b*, and has a substantially L-shaped cross section that is gently inclined backward (toward the back surface of the frame) from its vertex. The second wave 1*d* continuous with and on the outer circumference of the first wave 1*c* has a convex cross section steeper than the first wave 1*c*. The first wave 1*c* on the inner circumference has a greater curvature radius than the second wave on the outer circumference.

The first wave 1*c* has a lower vertex than the second wave 1*d*. The first wave 1*c* is located lower than the second wave 1*d* to adjust the displacement characteristics. By lowering the vertex of the first wave 1*c*, the damper is more easily stretched and less likely to move under the voice coil 4 than in the case where the vertexes are at the same height. This configuration reliably reduces the abutting of the voice coil onto the bottom when the vibration system moves downward.

The positions of the bend 1*a*, at which the inner circumference of the damper 1 is attached to the voice coil 4 and the mount 10*b*, on which the outer circumferential end 1*g* of the damper is attached to the thin frame 10 are compared. In the shown state, the outer circumferential end 1*g* of the damper is located lower than the bend 1*a*. In this manner, the bend 1*a* is located higher than the mount 10*b*, while the wave section L2 is located lower than the bend 1*a*. The vertexes of the first and second waves 1*c* and 1*d* are at heights equal to or lower than the outer circumferential end 1*g* of the damper.

The damper 1 is shaped to pass through a point lower than the outer circumferential end 1*g* between the bend 1*a* and the outer circumferential end 1*g*. In FIG. 2, the curve 1*b* has, at the lowest point of the damper 1, the outer circumferential end 1*e* which leads through the waves of the first and second waves 1*c* and 1*d* to the outer circumferential end 1*g* of the damper which is higher than the outer circumferential end 1*e*. That is, it can also be said that the damper does not linearly connect the bend 1*a* and the outer circumferential end 1*g*, but bends, for example, to pass through a point lower than the outer circumferential end 1*g* even once in this cross section and is bridged to the mount 10*b* for the outer circumference of the damper. With this configuration, the damper has a greater radial length even in a tiny space between the thin frame 10 and the lead wire or the diaphragm 2A than in a linear connection between the bend 1*a* and the outer circumferential end 1*g*. This allows efficient arrangement of the curve 1*b* and the wave section L2, improves the flexibility in designing the damper, and reduces the thickness of the speaker.

The outer circumferential end 1*e* of the curve 1*b* is located lower than the upper end 6*b* of the yoke 6. This allows efficient arrangement of the curve 1*b* and the wave section L2 and further reduces the thickness of the speaker.

Figure 3:
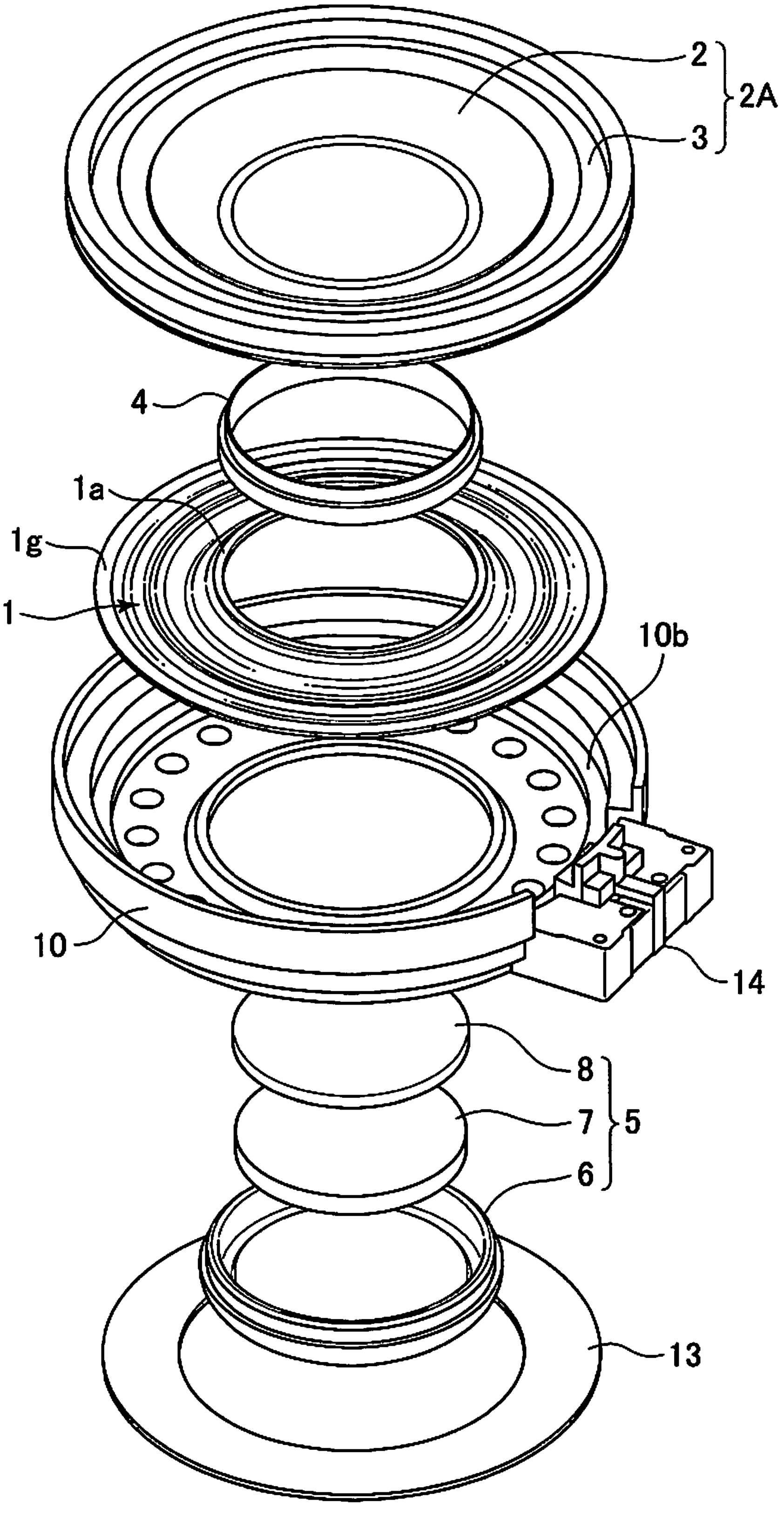
FIG. 3 is an exploded perspective view of the thin speaker according to the present disclosure.

FIG. 3 is an exploded perspective view of the thin speaker according to the present disclosure.

The diaphragm 2A includes the diaphragm body 2 made of paper and the edge 3 made of a fabric on the outer circumference of the diaphragm body 2. Located under the diaphragm 2A is the voice coil 4. The bend 1*a* of the damper 1 is coupled to the lower surface of the diaphragm body 2, while the outer circumferential end 1*g* of the damper is coupled to the mount 10*b* for the outer circumference of the damper in the thin frame 10. Reference character 14 denotes a terminal of the thin frame 10. Located under the thin frame 10 is the magnetic circuit 5 including the plate 8, the magnet 7, and the yoke 6. The thin frame 10 has the dust-proof fabric 13 on the back surface.

Figure 4:
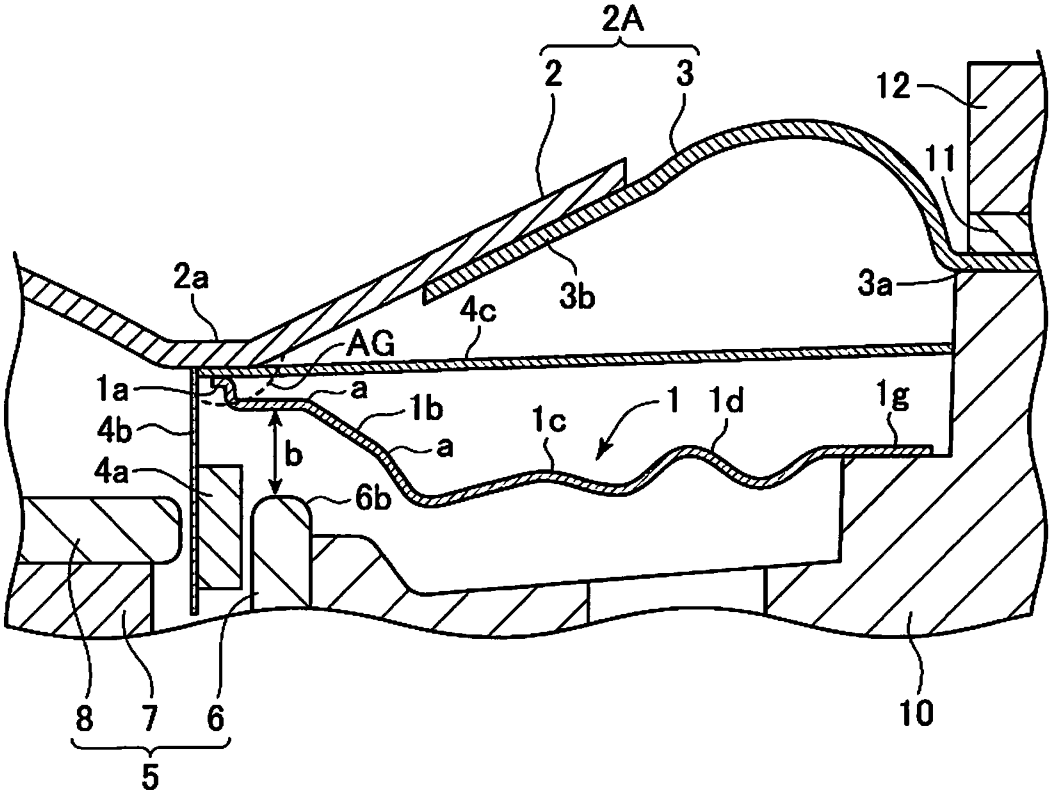
FIG. 4 illustrates an adhesion of a lead wire of a voice coil in the thin speaker according to the present disclosure.

The lead wire of the voice coil 4 is connected to the terminal 14 of the thin frame 10. FIG. 4 shows an arrangement of a lead wire 4*c* of the voice coil 4.

The lead wire 4*c* out of the voice coil 4*a* is led out from the outer circumference of the upper end of the voice coil bobbin 4*b* along the back surface of the diaphragm body 2. That is, the lead wire 4*c* is sandwiched between the back surface of the diaphragm body 2 and the bend 1*a* of the damper 1. The diaphragm body 2, the bend 1*a*, the voice coil bobbin 4*b*, and the lead wire 4*c* of the voice coil 4*a* are collectively bonded at four points by an adhesive as indicated by an adhesive section AG surrounded by the broken line.

The lead wire 4*c* is directly drawn out of the adhesive section AG to the outer circumference and has the outer end connected to the terminal 14 by an adhesive (not shown).

Figure 5:
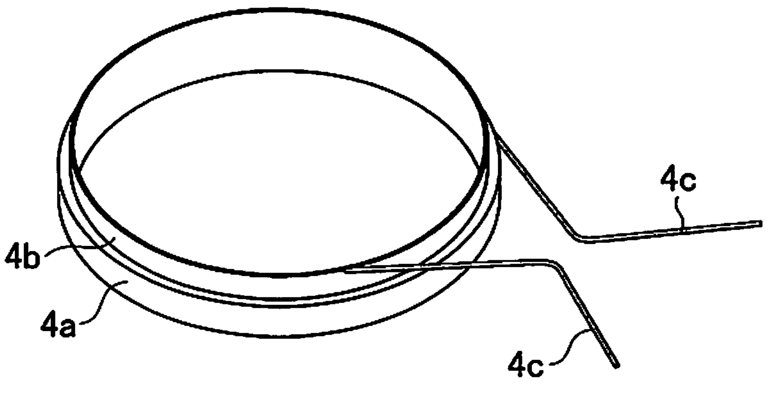
FIG. 5 is a perspective view of the voice coil and the lead wire according to the present disclosure.

FIG. 5 shows how to draw out the lead wire 4*c*. In order to reduce the thickness of the lead wire 4*c*, no relay lead wire is used, but a stress-concentrated portion is formed into an L-shape to disperse the stress. The outer end of the portion is connected to the terminal 14 by an adhesive.

In this manner, the thin speaker S of the present disclosure is configured.

Results of simulating displacements of the vibration system and the amplitude characteristics of the thin speaker S configured as described above as follows.

Figure 6:
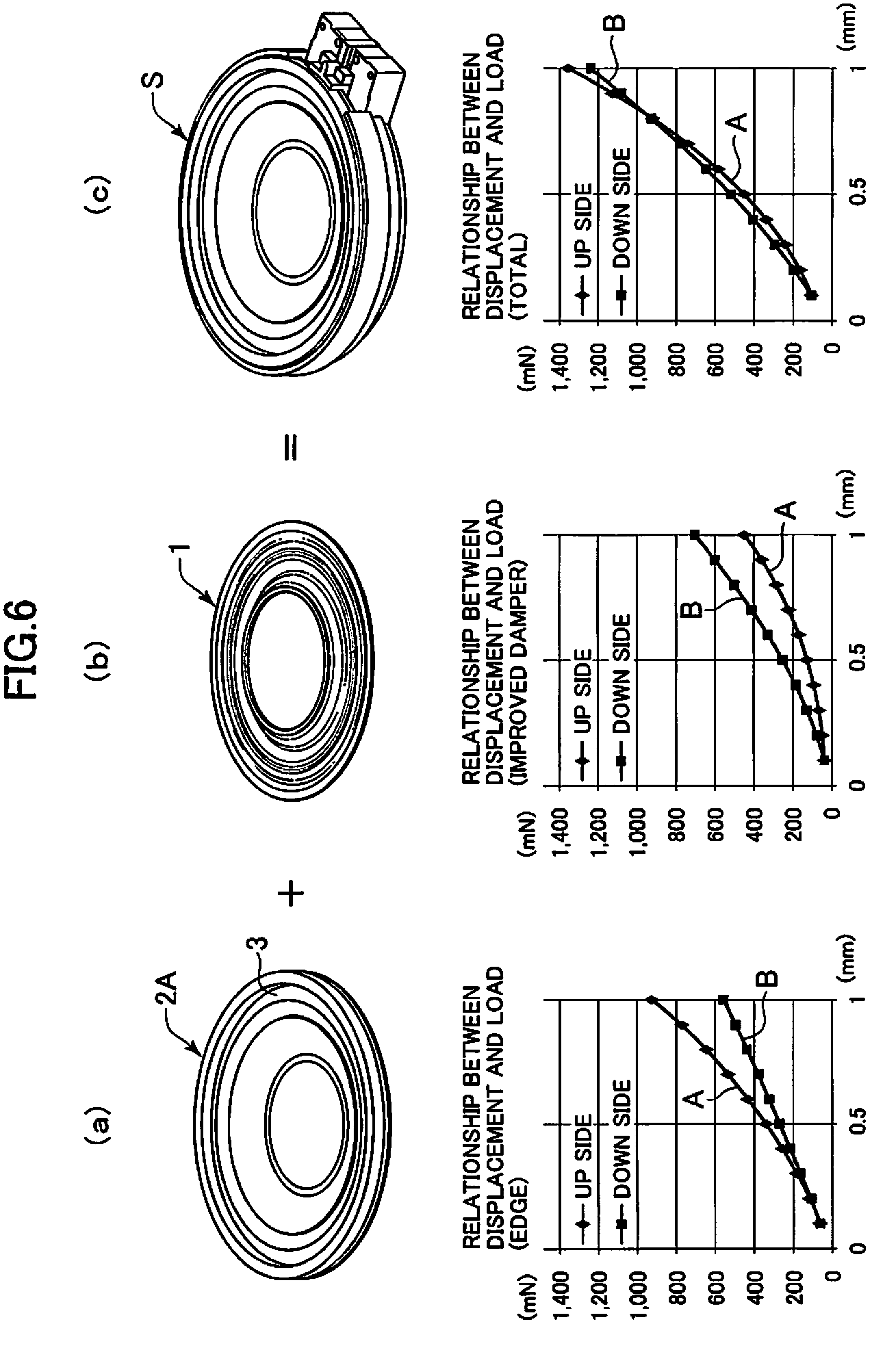
FIG. 6 illustrates results of simulating displacements in a vibration system of the thin speaker according to the present disclosure.

FIG. 6 includes the illustrations (a) to (c) respectively showing results of simulating displacements of the edge 3 of the diaphragm 2A, the damper 1, and the vibration system of the thin speaker S as the combination and integration thereof.

In the illustrations (a) to (c) of FIG. 6, the lower graphs show their characteristics. In each graph, the vertical axis represents a load and the horizontal axis represents the displacement. The curve A represents the forward "UP-SIDE" movement, and the curve B represents the backward "DOWN-SIDE" movement.

It is found from the comparison between the relationships between the load and the displacement of (i) the damper 1 according to the present disclosure in the illustration (b) of this FIG. 6 and (ii) the damper 1' of the prototype in the illustration (b) of FIG. 13 that there is an improvement in the characteristics.

The following is also found from the comparison between the relationships between the load and the displacement of (i) the edge 3 and the damper 1' of the prototype (see the illustration (c) of FIG. 13) and (ii) the present disclosure in the illustration (c) of FIG. 6. The forward "UP-SIDE" and the backward "DOWN-SIDE" have substantially the same shape in the present disclosure.

Figure 7:
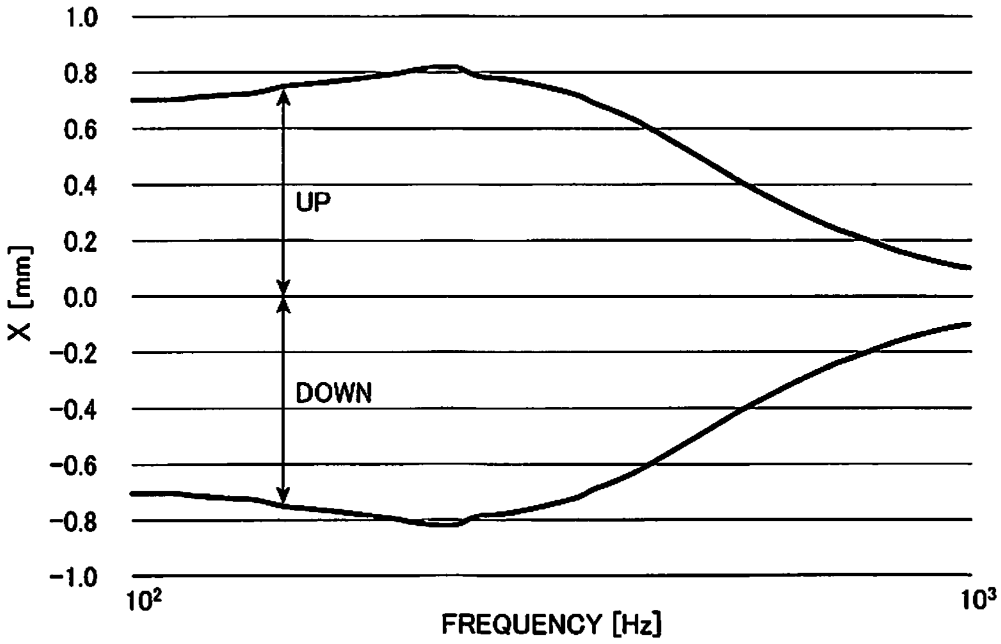
FIG. 7 shows a result of measuring the amplitude of a damper of the thin speaker according to the present disclosure.

FIG. 7 shows a result of measuring a displacement with respective to the frequency. In the present disclosure, the non-linearity of the amplitude characteristics of the edge 3 of the diaphragm 2A is cancelled by the non-linearity of the amplitude characteristics of the damper 1. This causes a symmetrical amplitude of the forward "UP-SIDE" displacement and the backward "DOWN-SIDE" displacement, and reduces distortions.

Figure 8:
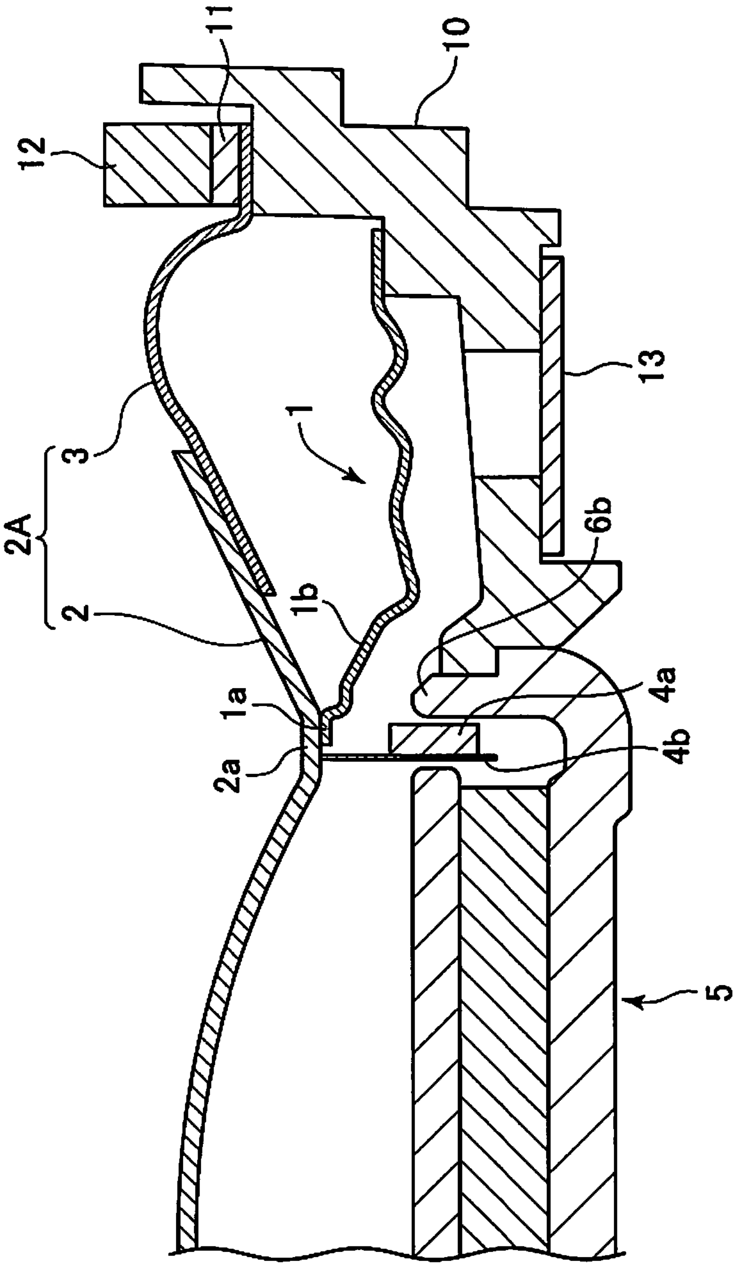
FIG. 8 shows a vibration system in a normal state (without any signal) of the thin speaker according to the present disclosure.
Figure 9:
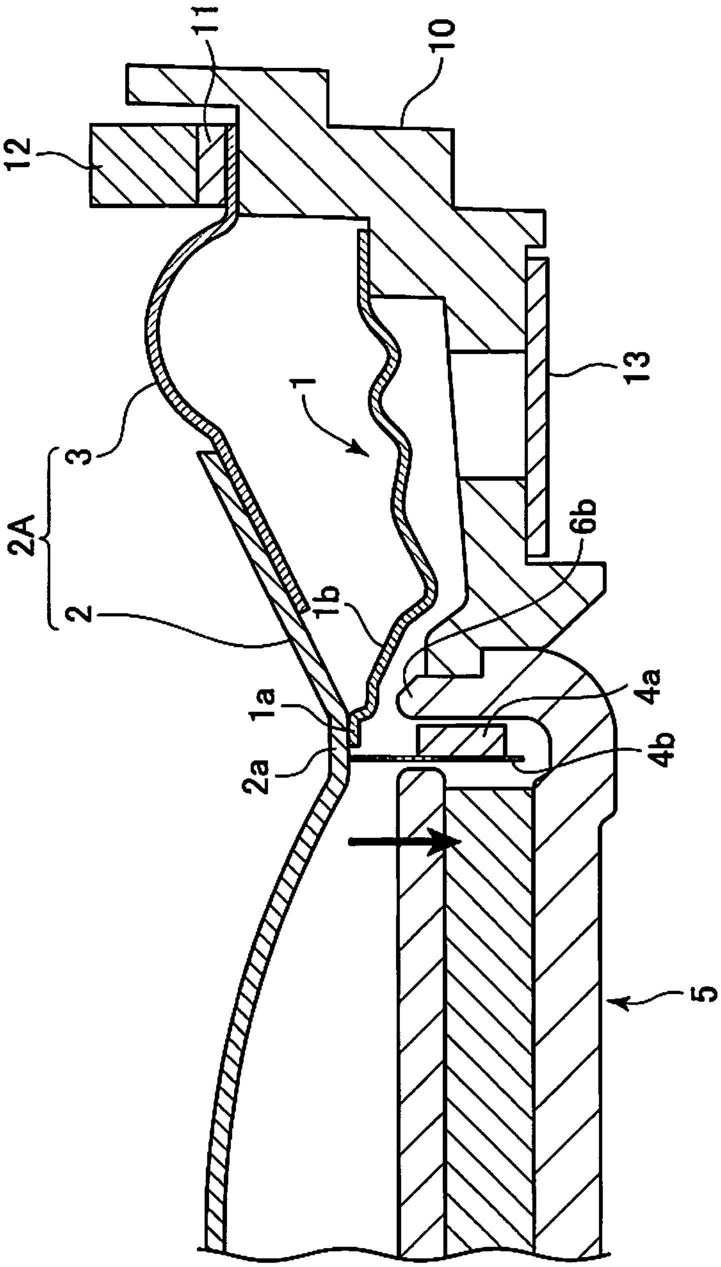
FIG. 9 shows a downward movement of the vibration system.

FIG. 8 shows a stationary state of the vibration system, whereas FIG. 9 shows a deformation of the damper 1 when an audio current flows through the voice coil 4*a* and the diaphragm 2A moves downward. The present disclosure reduces the abutting of the voice coil bobbin 4*b* onto the bottom of the yoke 6, that is, abutting of the voice coil onto the bottom.

As described above, the damper 1 according to the present disclosure reduces the tendency of the vibration system to move downward and abutting of the voice coil bobbin 4*b* onto the bottom of the yoke 6, thereby coping with a high input level.

Figure 10:
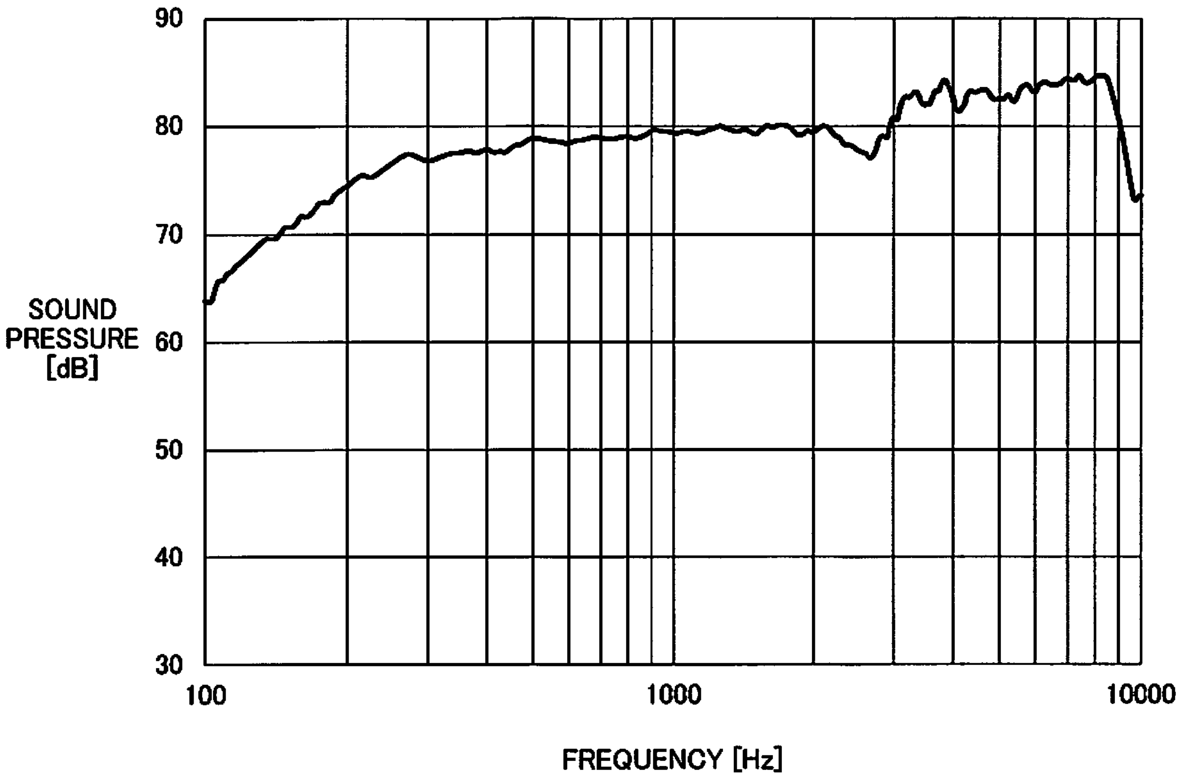
FIG. 10 shows frequency characteristics with respect to a sound pressure according to the present disclosure.

As shown in FIG. 10, the present disclosure provides flat and excellent frequency characteristics from low to middle frequencies.

While an example has been described above where the thin speaker S according to the present disclosure is used in an automatic vehicle emergency notification system, the thin speaker S is also applicable for other purposes.

The size of the damper 1 is set to be fitted into the thin frame 10 according to a specification but is not limited thereto. The size may correspond to even a larger size of the thin frame 10.

DESCRIPTION OF REFERENCE CHARACTERS

1 Damper
1*a* Bend
1*b* Curve
1*c* First Wave
1*d* Second Wave
1*e* Outer Circumferential End (of Curve)
1*f* Outer Circumferential End (of Wave Section)
1*g* Outer Circumferential End of Damper
2 Diaphragm Body
2*a* Voice Coil Mount
2A Diaphragm
3 Edge
4 Voice Coil
4*a* Voice Coil
4*b* Voice Coil Bobbin
4*c* Lead Wire
5 Magnetic Circuit
6 Yoke
6*a* Outer Circumference of Yoke
7 Magnet
8 Plate
9 Magnetic Gap
10 Frame
10*a* Frame Mount
10*b* Mount for Outer Circumference of Damper
10*c* Mount for Outer Circumference of Edge
13 Dust-Proof Fabric
14 Terminal
S, S" Speaker
L1 Inner Circumference of Damper
L2 Wave Section
a Fold
b, b" Space
AG Adhesive Section

The invention claimed is:

1. A thin speaker comprising:

a voice coil bobbin including a voice coil and having an upper end to which a back surface of a diaphragm body is attached;

the diaphragm body having an outer circumference attached to a thin frame with an edge interposed therebetween;

the thin frame having a bottom including a magnetic circuit having a magnetic gap;

the magnetic gap including the voice coil, the voice coil bobbin to which an inner circumference of a damper is attached, and the damper having an outer circumference attached to a mount for the outer circumference of the damper in the thin frame;

the inner circumference of the damper including a curve descending in a bow shape, and a wave section extending from an outer circumferential end of the curve to the outer circumference of the damper, the inner circumference of the damper being shorter than the wave section; and wherein the inner circumference of the damper includes a bend protruding upward and having a flat upper surface in contact with and attached to the back surface of the diaphragm body.

2. The thin speaker of claim 1, wherein the wave section includes at least two or more waves each having a vertex at a height equal to or lower than an outer circumferential end of the outer circumference of the damper.

3. The thin speaker of claim 2, wherein the two or more waves include at least a first inner wave on an inner circumference and a second outer wave on an outer circumference, and the vertex of the first wave is located lower than the vertex of the second wave.

4. The thin speaker of claim 1, wherein the curve includes a fold that orients the curve downward and increases rigidity.

5. The thin speaker of claim 1, wherein an outer circumferential end of the outer circumference of the damper is located lower than the bend.

6. The thin speaker of claim 1, wherein the damper is shaped to pass through a point lower than an outer circumferential end of the damper between the bent and the outer circumferential end.

7. The thin speak of claim 1, wherein the outer circumferential end of the curve is located lower than an upper end of a yoke of the magnetic circuit.

* * * * *